US008834254B2

(12) United States Patent
Buchholz et al.

(10) Patent No.: US 8,834,254 B2
(45) Date of Patent: Sep. 16, 2014

(54) ACCOUNT-BASED-WAGERING MOBILE CONTROLLER

(75) Inventors: Dale R. Buchholz, Palatine, IL (US); James J. Getz, Henderson, NV (US); Erhard W. Rathsack, Reno, NV (US); Pamela S. Smith, Chicago, IL (US); Noel S. Steere, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/605,303

(22) Filed: Sep. 6, 2012

(65) Prior Publication Data

US 2013/0252714 A1 Sep. 26, 2013

Related U.S. Application Data

(60) Provisional application No. 61/531,477, filed on Sep. 6, 2011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC ............................................... 463/20; 463/25

(58) Field of Classification Search
USPC ..................................................... 463/20, 25
See application file for complete search history.

(56) References Cited

U.S. PATENT DOCUMENTS

| | | | |
|---|---|---|---|
| 4,926,327 | A | 5/1990 | Sidley |
| 4,937,853 | A | 6/1990 | Brule et al. |
| 5,007,649 | A | 4/1991 | Richardson |
| 5,038,022 | A | 8/1991 | Lucero |
| 5,042,809 | A | 8/1991 | Richardson |
| 5,083,271 | A | 1/1992 | Thacher et al. |
| 5,096,195 | A | 3/1992 | Gimmon |
| 5,119,295 | A | 6/1992 | Kapur |
| 5,135,224 | A | 8/1992 | Yamamoto et al. |
| 5,159,549 | A | 10/1992 | Hallman, Jr. et al. |
| 5,179,517 | A | 1/1993 | Sarbin et al. |
| 5,192,854 | A | 3/1993 | Counts |
| 5,197,094 | A | 3/1993 | Tillery et al. |
| 5,223,698 | A | 6/1993 | Kapur |
| 5,265,874 | A | 11/1993 | Dickinson et al. |
| 5,277,424 | A | 1/1994 | Wilms |

(Continued)

FOREIGN PATENT DOCUMENTS

| | | |
|---|---|---|
| EP | 1139310 | 10/2001 |
| WO | WO-0221377 | 3/2002 |

(Continued)

*Primary Examiner* — William M. Brewster
(74) *Attorney, Agent, or Firm* — DeLizio Gilliam, PLLC

(57) ABSTRACT

A wagering game system and its operations are described herein. In some embodiments, the operations can include detecting, wirelessly, an identifier associated with a portable wireless device. In some embodiments, the identifier is assigned to a wagering game player account. The operations can further include initiating a wagering game session for the wagering game player account, via a wagering game machine, in response to detecting the identifier. The operations can further include detecting, wirelessly, a use of the portable wireless device in response to player input via the portable wireless device and, based on the use of the portable wireless device, authorizing initiation of the wagering game session and/or performing one or more activities via a wagering game application during the wagering game session.

29 Claims, 12 Drawing Sheets

(56) References Cited

U.S. PATENT DOCUMENTS

| | | | |
|---|---|---|---|
| 5,290,033 | A | 3/1994 | Bittner et al. |
| 5,297,802 | A | 3/1994 | Pocock et al. |
| 5,317,135 | A | 5/1994 | Finocchio |
| 5,321,241 | A | 6/1994 | Craine |
| 5,324,035 | A | 6/1994 | Morris et al. |
| 5,326,104 | A | 7/1994 | Pease et al. |
| 5,332,076 | A | 7/1994 | Ziegert |
| 5,348,299 | A | 9/1994 | Clapper, Jr. |
| 5,371,345 | A | 12/1994 | LeStrange et al. |
| 5,373,440 | A | 12/1994 | Cohen et al. |
| 5,408,417 | A | 4/1995 | Wilder |
| 5,429,361 | A | 7/1995 | Raven et al. |
| 5,440,108 | A | 8/1995 | Tran et al. |
| 5,457,306 | A | 10/1995 | Lucero |
| 5,470,079 | A | 11/1995 | LeStrange et al. |
| 5,475,205 | A | 12/1995 | Behm et al. |
| 5,491,326 | A | 2/1996 | Marceau et al. |
| 5,507,491 | A | 4/1996 | Gatto et al. |
| 5,536,008 | A | 7/1996 | Clapper, Jr. |
| 5,551,692 | A | 9/1996 | Pettit et al. |
| 5,559,312 | A | 9/1996 | Lucero |
| 5,575,374 | A | 11/1996 | Orus et al. |
| 5,580,310 | A | 12/1996 | Orus et al. |
| 5,580,311 | A | 12/1996 | Haste, III |
| 5,609,337 | A | 3/1997 | Clapper, Jr. |
| 5,613,680 | A | 3/1997 | Groves et al. |
| 5,613,912 | A | 3/1997 | Slater |
| 5,627,356 | A | 5/1997 | Takemoto et al. |
| 5,645,485 | A | 7/1997 | Clapper, Jr. |
| 5,655,961 | A | 8/1997 | Acres et al. |
| 5,655,966 | A | 8/1997 | Werdin, Jr. et al. |
| 5,674,128 | A | 10/1997 | Holch et al. |
| 5,697,482 | A | 12/1997 | Orus et al. |
| 5,722,890 | A | 3/1998 | Libby et al. |
| 5,735,432 | A | 4/1998 | Stoken et al. |
| 5,737,418 | A | 4/1998 | Saffari et al. |
| 5,749,784 | A | 5/1998 | Clapper, Jr. |
| 5,755,621 | A | 5/1998 | Marks et al. |
| 5,762,552 | A | 6/1998 | Vuong et al. |
| 5,770,533 | A | 6/1998 | Franchi |
| 5,797,794 | A | 8/1998 | Angell |
| 5,800,269 | A | 9/1998 | Holch et al. |
| 5,810,664 | A | 9/1998 | Clapper, Jr. |
| 5,811,772 | A | 9/1998 | Lucero |
| 5,816,918 | A | 10/1998 | Kelly et al. |
| 5,830,068 | A | 11/1998 | Brenner et al. |
| 5,839,956 | A | 11/1998 | Takemoto |
| 5,869,826 | A | 2/1999 | Eleftheriou |
| 5,902,983 | A | 5/1999 | Crevelt et al. |
| 5,917,725 | A | 6/1999 | Thacher et al. |
| 5,919,091 | A | 7/1999 | Bell et al. |
| 5,928,082 | A | 7/1999 | Clapper, Jr. |
| 5,949,042 | A | 9/1999 | Dietz, II et al. |
| 5,952,640 | A | 9/1999 | Lucero |
| 5,959,277 | A | 9/1999 | Lucero |
| 5,984,779 | A | 11/1999 | Bridgeman et al. |
| 6,012,832 | A | 1/2000 | Saunders et al. |
| 6,048,269 | A | 4/2000 | Burns et al. |
| 6,050,487 | A | 4/2000 | Bonifas et al. |
| 6,089,982 | A | 7/2000 | Holch et al. |
| 6,280,326 | B1 | 8/2001 | Saunders |
| 6,280,328 | B1 | 8/2001 | Holch et al. |
| 6,340,331 | B1 | 1/2002 | Saunders et al. |
| 6,471,590 | B2 | 10/2002 | Saunders |
| 6,511,377 | B1 | 1/2003 | Weiss |
| 6,547,664 | B2 | 4/2003 | Saunders |
| 6,577,733 | B1 | 6/2003 | Charrin |
| 6,579,182 | B1 | 6/2003 | Orus et al. |
| 6,585,598 | B2 | 7/2003 | Nguyen et al. |
| 6,601,771 | B2 | 8/2003 | Charrin |
| 6,607,441 | B1 | 8/2003 | Acres |
| 6,623,357 | B2 | 9/2003 | Chowdhury |
| 6,645,075 | B1 | 11/2003 | Gatto et al. |
| 6,652,380 | B1 | 11/2003 | Luciano |
| 6,729,957 | B2 | 5/2004 | Burns et al. |
| 6,729,958 | B2 | 5/2004 | Burns et al. |
| 6,735,487 | B1 | 5/2004 | Marshall et al. |
| 6,736,725 | B2 | 5/2004 | Burns et al. |
| 6,739,975 | B2 | 5/2004 | Nguyen et al. |
| 6,746,330 | B2 | 6/2004 | Cannon |
| 6,752,312 | B1 | 6/2004 | Chamberlain et al. |
| 6,851,607 | B2 | 2/2005 | Orus et al. |
| 6,890,258 | B2 | 5/2005 | Weiss |
| 6,896,616 | B2 | 5/2005 | Weiss |
| 6,896,619 | B2 | 5/2005 | Baltz et al. |
| 6,905,411 | B2 | 6/2005 | Nguyen et al. |
| 6,908,391 | B2 | 6/2005 | Gatto et al. |
| 6,916,244 | B2 | 7/2005 | Gatto et al. |
| 6,916,247 | B2 | 7/2005 | Gatto et al. |
| 6,935,953 | B2 | 8/2005 | Marcu |
| 6,945,870 | B2 | 9/2005 | Gatto et al. |
| 6,969,320 | B2 | 11/2005 | Lind et al. |
| 6,997,807 | B2 | 2/2006 | Weiss |
| 7,004,837 | B1 | 2/2006 | Crowder, Jr. et al. |
| 7,033,274 | B1 | 4/2006 | Orus et al. |
| 7,036,012 | B2 | 4/2006 | Charrin |
| 7,080,782 | B2 | 7/2006 | Charrin |
| 7,147,558 | B2 | 12/2006 | Giobbi |
| 7,152,783 | B2 | 12/2006 | Charrin |
| 7,217,190 | B2 | 5/2007 | Weiss |
| 7,467,404 | B2 | 12/2008 | McAllister et al. |
| 7,783,381 | B2 | 8/2010 | Walker et al. |
| 7,846,020 | B2 | 12/2010 | Walker et al. |
| 7,850,518 | B2 | 12/2010 | Walker et al. |
| 8,007,361 | B2 | 8/2011 | Walker et al. |
| 8,021,231 | B2 | 9/2011 | Walker et al. |
| 8,113,935 | B2 | 2/2012 | Walker et al. |
| 8,142,280 | B2 | 3/2012 | Walker et al. |
| 8,197,324 | B2 | 6/2012 | Walker et al. |
| 8,231,455 | B2 | 7/2012 | Walker et al. |
| 2005/0109841 | A1 * | 5/2005 | Ryan et al. .................... 235/380 |
| 2008/0207307 | A1 | 8/2008 | Cunningham, III et al. |
| 2008/0274798 | A1 | 11/2008 | Walker et al. |
| 2008/0305862 | A1 | 12/2008 | Walker et al. |
| 2009/0098936 | A1 | 4/2009 | Lawrence et al. |
| 2009/0124376 | A1 | 5/2009 | Kelly et al. |
| 2009/0176565 | A1 | 7/2009 | Kelly |
| 2009/0176566 | A1 | 7/2009 | Kelly |
| 2009/0239667 | A1 | 9/2009 | Rowe et al. |
| 2010/0069138 | A1 * | 3/2010 | Acres .............................. 463/20 |
| 2010/0148442 | A1 | 6/2010 | Walker et al. |
| 2010/0252997 | A1 | 10/2010 | Walker et al. |
| 2011/0014963 | A1 | 1/2011 | Walker et al. |
| 2012/0115616 | A1 | 5/2012 | Phillips et al. |
| 2012/0172114 | A1 | 7/2012 | Walker et al. |

FOREIGN PATENT DOCUMENTS

| | | |
|---|---|---|
| WO | WO-2005033911 | 4/2005 |
| WO | WO-2006017268 | 2/2006 |
| WO | WO-2006036906 | 4/2006 |
| WO | WO-2007059418 | 5/2007 |
| WO | WO-2007067213 | 6/2007 |
| WO | WO-2007107883 | 9/2007 |
| WO | WO-2007134109 | 11/2007 |
| WO | WO-2008013541 | 1/2008 |
| WO | WO-2008018874 | 2/2008 |
| WO | WO-2008027801 | 3/2008 |
| WO | WO-2008039174 | 4/2008 |
| WO | WO-2008039175 | 4/2008 |
| WO | WO-2008101204 | 8/2008 |
| WO | WO-2008106270 | 9/2008 |
| WO | WO-2008154048 | 12/2008 |
| WO | WO-2008154588 | 12/2008 |
| WO | WO-2009025673 | 2/2009 |
| WO | WO-2009032007 | 3/2009 |
| WO | WO-2009064813 | 5/2009 |
| WO | WO-2011156401 | 12/2011 |

* cited by examiner

ACCOUNT-BASED-WAGERING MOBILE CONTROLLER

RELATED APPLICATIONS

This application claims the priority benefit of U.S. Provisional Patent Application No. 61/531,477 filed on Sep. 6, 2011.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

TECHNICAL FIELD

Embodiments of the inventive subject matter relate generally to wagering game systems and networks that, more particularly, control wagering games via a wireless, portable device.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Furthermore, to facilitate the use of wagering games, some wagering game manufacturers generate wagering game machines and applications that utilize a player account. Using a player account for wagering games is referred to generally as account based wagering (ABW) and tracking player via the accounts is generally referred to as player tracking. A player signs up for the player account, stores information in the account and keeps funds in an account for wagering. A player can login to a wagering game machine, which presents wagering games during a wagering game session. The wagering game machine can read from a player-tracking card that identifies the player, such as when a player swipes a magnetic strip of the card against a magnetic card reader. The magnetic card reader reads unique information about the player account via the card swipe and initiates a wagering game session using the unique information to access the player account from an account server. The wagering game machine conducts the wagering game session using the player account, such as to use funds for wagering, for storing rewards earned from playing wagering games, etc. Wagering game manufacturers, therefore, are continuously looking for innovative ways of tracking players and enhancing use of account based wagering.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into six sections. The first section provides an introduction to embodiments. The second section describes example embodiments while the third section describes example operations performed by some embodiments. The fourth section describes additional example embodiments while the fifth section describes example operating environments. The sixth section presents general comments.

Introduction

This section provides an introduction to some embodiments.

Figure 1:
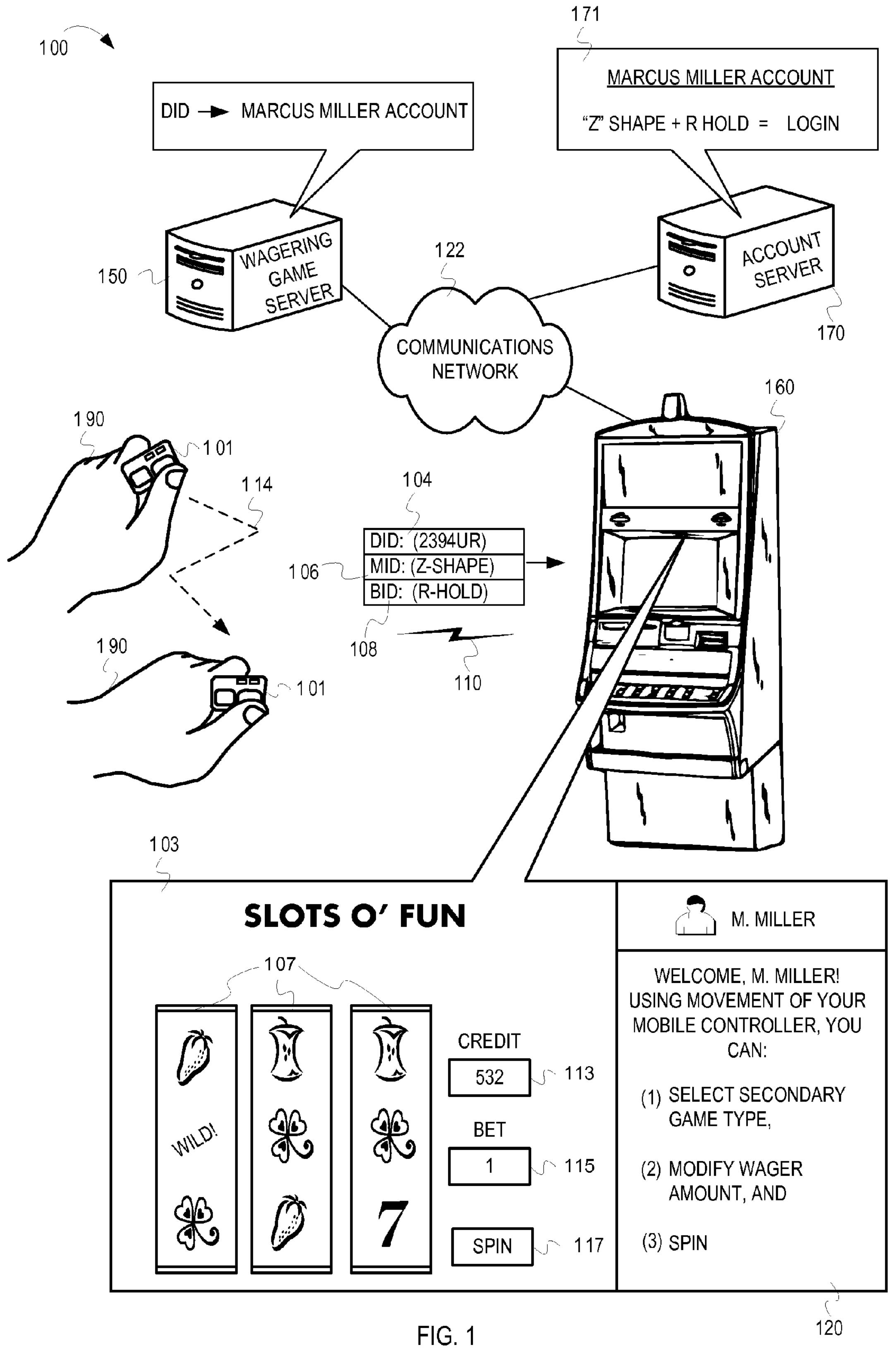
FIG. 1 is an illustration of logging in to, and conducting wagering activity during a wagering game session using a mobile controller, according to some embodiments.

As stated previously, wagering game manufacturers are continuously looking for innovative ways of tracking players and enhancing use of account based wagering. FIG. 1 is a conceptual diagram that illustrates an example of logging in to, and conducting wagering activity during a wagering game session using a mobile controller, according to some embodiments. In FIG. 1, a wagering game system ("system") 100 includes a wagering game machine 160 connected to a wagering game server 150 via a communications network 122. Also included in the system 100 is an account server 170 connected to the communications network 122. The account server 170 can host a wagering game account (e.g., player account 171 for the user "Marcus Miller"). A user 190 (e.g., Marcus Miller) logs in wirelessly to the wagering game machine 160 using a pocket-sized, wireless device, or mobile controller, such as a key fob ("fob") 101. In some embodiments, the fob 101 is configured as a physical security token (e.g., a physical device that an authorized user of computer services can utilize for authentication). Furthermore, the fob 101 is configured to wirelessly transmit data (e.g., via Bluetooth), such as authentication information. Thus, the fob 101 may also be referred to as a contactless token, because communication can be conducted wirelessly, without direct physical contact. In some embodiments, in response to user activation (e.g., in response to detection of a pressing of a button on the fob 101), the fob 101 forms a logical connection to a wagering game client, such as the wagering game machine 160, but does not require a physical connection. In some embodiments, the fob 101 is small in size, such as to fit on a keychain. Therefore, in some embodiments, the fob 101 may also be referred to as a keychain token.

The wagering game machine 160 detects wireless signals from the fob 101 generated via user input, such as when the user 190 presses a button on the fob 101. When the user presses the button on the fob 101, for example, the fob 101 sends a wireless signal 110. In some embodiments, the fob 101 can authenticate a fingerprint of the user 190 before sending the wireless signal 110. The wireless signal 110 includes information about the fob 101 and use of the fob 101, such as a unique device identifier ("DID") 104 assigned to the fob 101 or a motion identifier ("MID") 106 that identifies a motion 114 performed by the user 190 (e.g., a "Z" motion made by the user 190 while pressing the button on the fob 101). The wireless signal 110 can also specify a button identifier ("BID") 108 that identifies a specific activity associated with the button on the fob 101 (e.g., holding down of a right-hand side button on the fob 101). The motion 114 and the specific activity associated with the button can be configured according to user preference prior to using the fob 101 (e.g., see FIG. 3 for an example).

The wagering game machine 160 receives the wireless signal 110 and verifies the identity assigned to the fob 101 (e.g., queries the wagering game server 150, which identifies that the DID 104 is assigned to the player account 171). The wagering game machine 160 can communicate with the account server 170 to access the player account 171. The wagering game machine 160 can further verify the meaning of the motion 114 and the button action according to user preference settings. For example, the wagering game machine 160 uses the MID 106 and BID 108 to determine that, according to user-preference settings of the player account 171, a "Z" motion in combination with an action of holding the right button on the fob 101 indicates an intention to "login" to the wagering game machine 160. Based on the verification of the meaning of the MID 106 and the BID 108, the wagering game machine 160 can then initiate a wagering game session for the player account 171. The wagering game machine 160 can also perform other security measures, such as asking for a password. The user 190 can use the fob 101 to control movement on a display of the wagering game machine 160, such as to enter numbers and letters of a password. The wagering game machine 160 and/or wagering game server 150 can then fund the wagering game session using funds stored in the player account 171 which can be used to gamble on gaming content (e.g., a primary game application 103 that includes reels 107, a credit meter 113, a bet meter 115, and a spin button 117). The wagering game machine 160 presents additional information 120 that indicates various gaming activities that can be performed via use of the fob 101, such as selecting secondary wagering game applications, modifying bet amounts, and spinning the reels 107. Thus, the fob 101 can be used as a game controller for the duration of the wagering game session to perform wagering game activities.

Further, some embodiments of the inventive subject matter describe examples of account-based-wagering mobile controllers in various venues accessible via a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), etc., or any combination of networks. Multiple users can be connected to the networks via computing devices. The multiple users can have accounts that subscribe to specific services, such as account-based-wagering systems (e.g., account-based-wagering game websites, account-based-wagering casino networks, etc.).

Further, in some embodiments herein a user may be referred to as a player (i.e., of wagering games), and a player may be referred to interchangeably as a player account. Account-based-wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Embodiments

This section describes some example embodiments.

Example Mobile Controller

Figure 2:
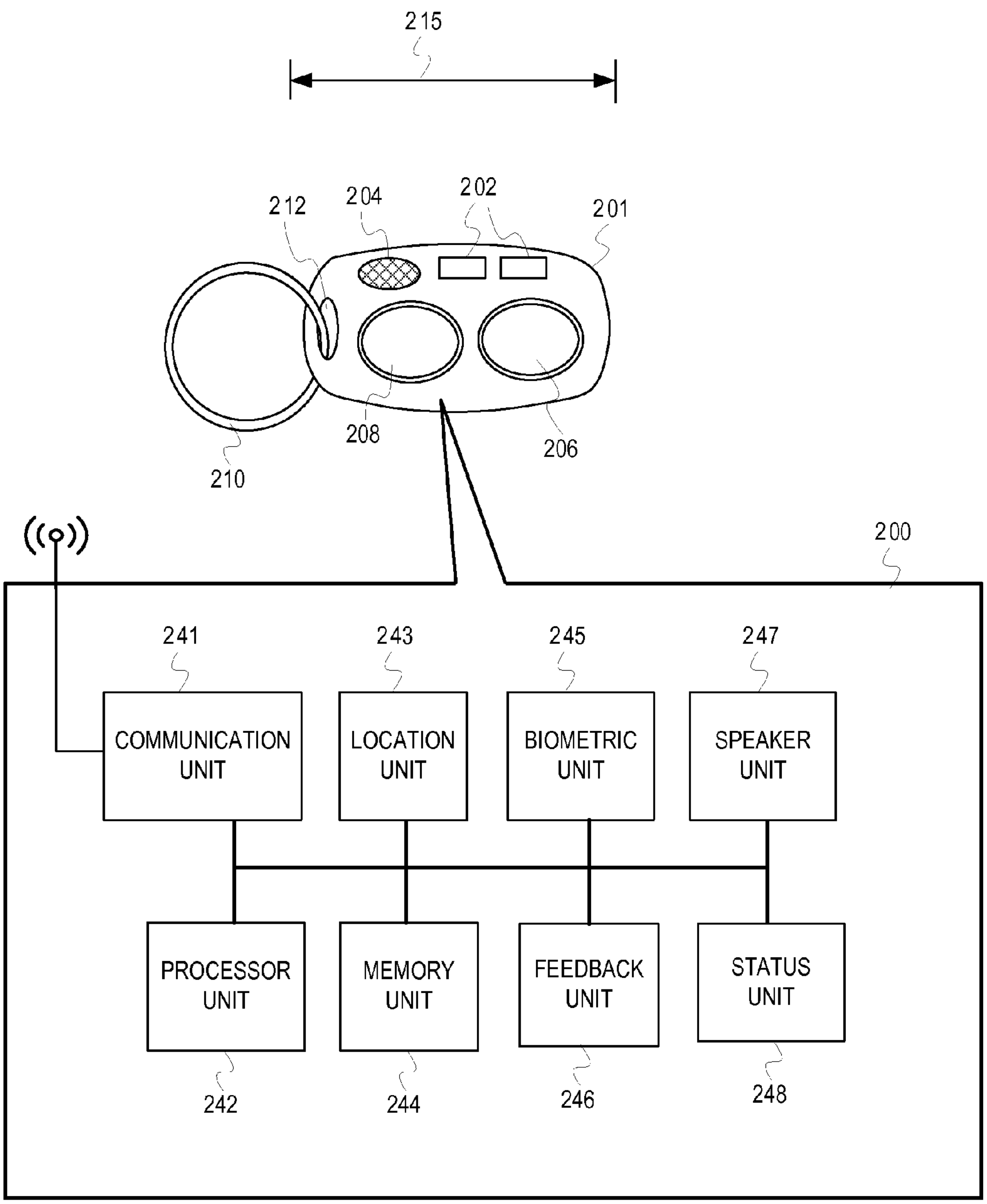
FIG. 2 is an illustration of an example of a mobile controller, according to some embodiments.

FIG. 2 is a conceptual diagram that illustrates an example of a mobile controller, according to some embodiments. In FIG. 2, a mobile controller (e.g., fob 201) includes buttons 206 and 208, indicator lights 202, and a speaker 204. The buttons 206 and 208 are configured for user input via touch. The buttons 206 and 208 can include biometric scanning capabilities to scan a player's fingerprints. The indicator lights 202 (e.g., light emitting diodes, or LEDS) indicate a status of activity performed via the fob 201 (e.g., to indicate that a login was successful and/or ongoing, to indicate that a wager was made, etc.). The fob 201 also includes a hole 212 through which a clip or ring 210 can be inserted (e.g., to attach to a set of keys). The size of the fob 201 can vary, but in some embodiments, it is small enough to fit into a player's pocket and small enough to be manipulated easily with the fingers. For instance, the fob 201 can have a length 215 of approximately 2 to 4 inches in some embodiments. An example architecture 200 for the fob 201 may include a communication unit 241 configured to communicate wireless signals, such as to transmit wireless data to a wagering game machine or receiving wireless signals from a wagering game machine, a wagering game server, or other casino devices. The architecture 200 also includes a location unit 243 configured to detect and generate data about movement, orientation, and position of the fob 201. The architecture 200 also includes a biometric unit 245 configured to track user biometrics (e.g., fingerprint scanning). The architecture 200 also includes a speaker unit 247 configured to generate sounds related to activity performed by, or in association with, the fob 201. The architecture 200 also includes a status unit 248 configured to indicate session and activity status, such as via the indicator lights 202. The architecture 200 also includes a feedback unit 246 configured to generate vibrations, or other feedback responses, that give feedback to a user regarding activities performed during a wagering game session. The architecture 200 also includes a memory unit 244 configured to store information about use of the fob 201 and information about the wagering game session. The architecture 200 also includes and a processor unit 242 configured to perform computational operations of the fob 201. Other elements not shown, but that may also be included in the fob 201, may include transceivers, gyroscopes, global positioning system components, encryption modules and so forth.

Figure 3:
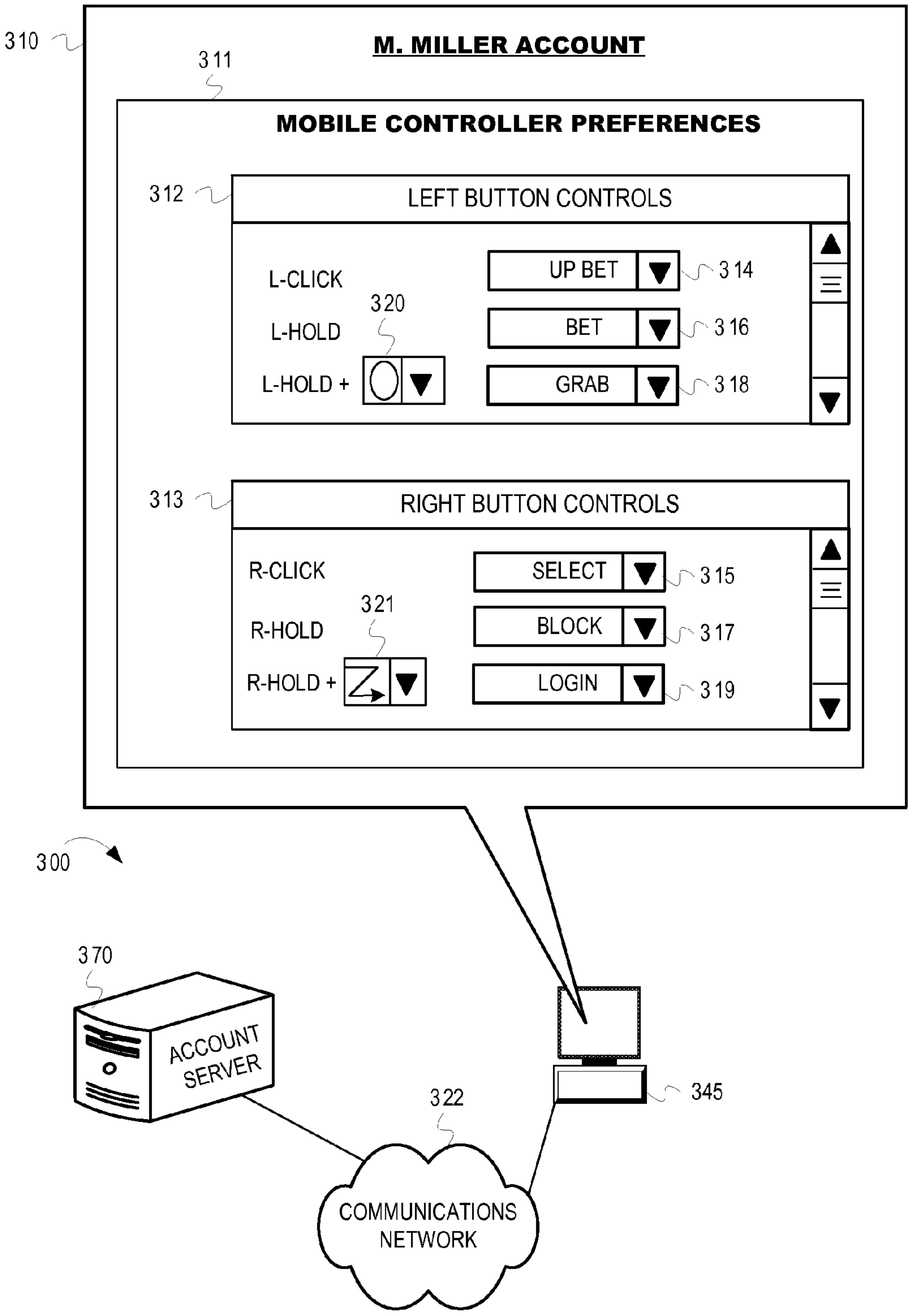
FIG. 3 is an illustration of configuring user preferences regarding actions performed via a mobile controller, according to some embodiments.

Example of Configuring User Preferences Regarding Actions Performed Via a Mobile Controller FIG. 3 is a conceptual diagram that illustrates an example of configuring user preferences regarding actions performed via a mobile controller, according to some embodiments. In FIG. 3, a configuration system 300 includes a personal computer 345 connected to an account server 370 via a communications network 322. The account server 370 is configured to store information about a player account (e.g., a player account assigned to the player "M. Miller"). The personal computer 345 presents a display 310, that indicates a graphical user interface with settings 311 related to user preferences associated with a fob, such as the fob 101 described in FIG. 1 or the fob 201 described in FIG. 2. A first group of settings 312 is related to one of the buttons (e.g., the "left" button) on the fob. For example, a first control 314 indicates an action to increase a betting value when the left button is clicked once ("L-Click"). A second control 316 indicates an action to place a wager, or bet, when the left button is held ("L-Hold"). A third control 318 indicates an action to grab an object on a display when the left button is held and an additional action is performed with the fob, such as a circular motion. A fourth control 320 indicates the additional action (i.e., the circular motion). A second group of settings 313 is related to a second of the buttons (e.g., the "right" button) on the fob. A fifth control 315 indicates an action to select a listed item (e.g., such as to select a game option from a list of secondary games) when the right button is clicked ("R-Click"). A sixth control 317 indicates an action to perform a defensive action (e.g., a "block"), such as during a group game to block another player's actions or to deflect a game object, when the right button is held ("R-Hold"). A seventh control 319 indicates an action to login to a wagering game machine, or other casino device, to initiate a wagering game session when the right button is held and when an additional action is performed with the fob, such as a "Z" motion. An eighth control 321 indicates the additional action (i.e., the "Z" motion).

Example of Controlling a Wagering Game Object Using a Mobile Controller

Figure 4:
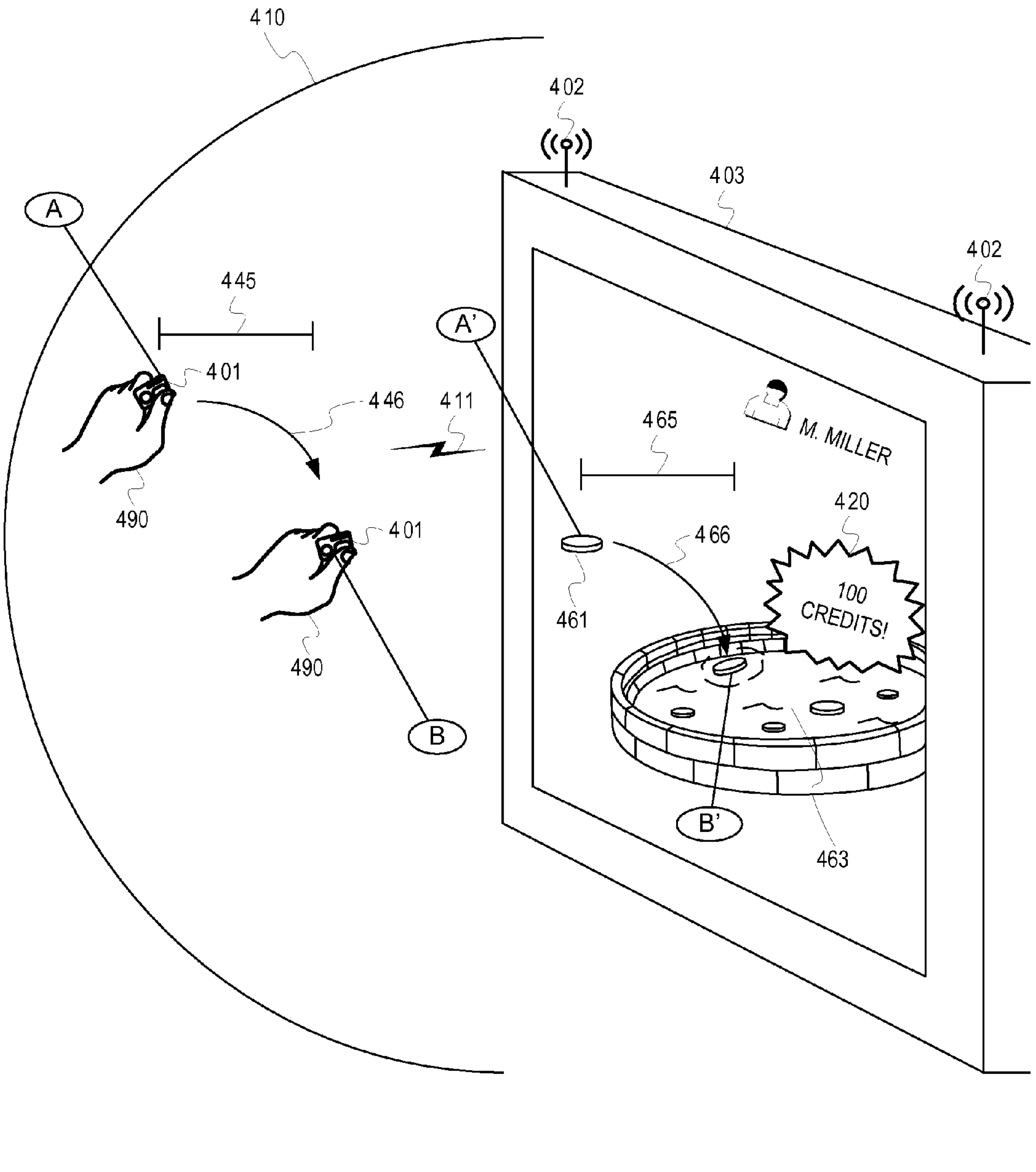
FIG. 4 is an illustration of controlling a wagering game object using a mobile controller, according to some embodiments.

FIG. 4 is a conceptual diagram that illustrates an example of controlling a wagering game object using a mobile controller, according to some embodiments. In FIG. 4, a user 490, within a proximity range 410 to a gaming device 403, holds a fob 401 and moves the fob 401 from a first position "A" to a second position "B." The motion of the fob 401 results in a motion pattern 446, such as a trajectory or path, and moves a given distance 445 in a horizontal plane, based on physical forces that the user 490 exerts. The gaming device 403 moves a gaming object, such as a graphical depiction of a coin 461, from a first position "A'" to a second position "B'," and causes the coin 461 to follow a motion pattern 466 based on the motion pattern 446 and the movement of the fob 401. For instance, the motion of the fob 401 may be a tossing or throwing motion. As a result, the gaming device 403 causes the movement of the coin 461 to respond to the motion of the fob 401, as if the fob 401 represented the coin 461, and generates an animation that depicts the coin 461 being tossed or thrown. User input via the fob 401 can indicate when the throwing motion begins (e.g., via a button press) and ends (e.g., via a button release). The coin 461 can then move, according to game physics, based on movement characteristics (e.g., motion, orientation, force, speed, etc.) of the motion of the fob 401. The fob 401 transmits the motion characteristics via one or more wireless signals 411 to the gaming device 403. The gaming device 403 receives the one or more signals 411, via wireless sensors 402, and interprets information in the one or more signals 411. Based on the interpretation of the one or more signals 411, the gaming device 403 generates a depiction of motion for the coin 461, causing the coin 461 to appear to fly a distance 465, as if thrown into a coin pool 463. The gaming device 403 can generate, via random number generation, a result of the coin toss, and presents a notification 420 that indicates a winning result of the coin toss.

Example of Controlling Wagering Game Activities Using a Mobile Controller

Figure 5A:
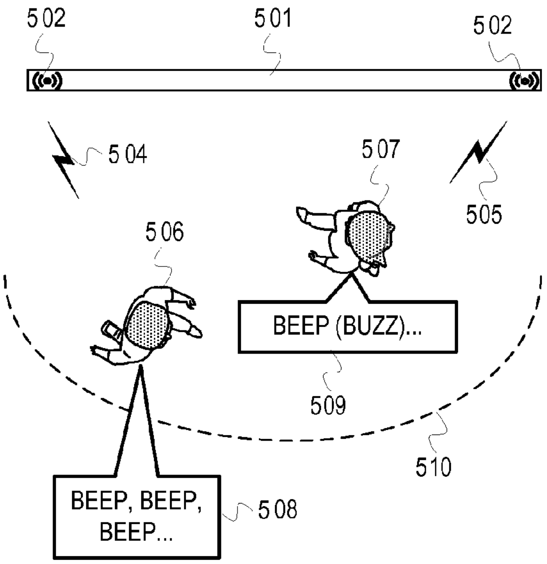
FIGS. 5A, 5B, 6A, 6B, 7A and 7B are illustrations of controlling wagering game activities using a mobile controller, according to some embodiments.
Figure 5B:
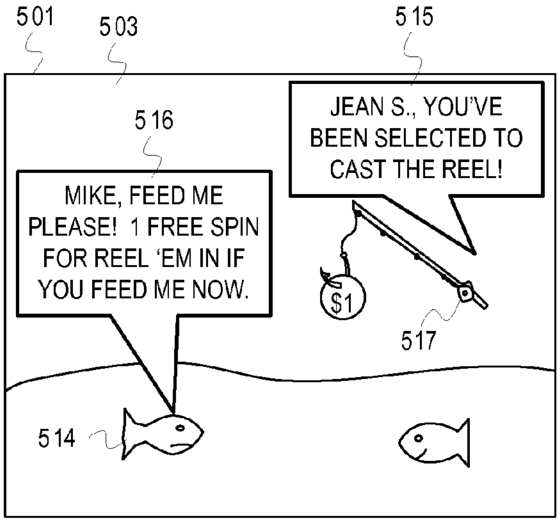

FIG. 5 is a conceptual diagram that illustrates an example of controlling wagering game activities using a mobile controller, according to some embodiments. In FIG. 5A, a first user 506 and second user 507 walk within a proximity range 510 of a gaming device 501 in a casino. The gaming device 501 presents wagering game content associated with a wagering game application, via a display 503, as illustrated in FIG. 5B. In FIG. 5A, the gaming device 501 includes wireless transceivers 502 that transmit wireless signals 504 and 505 to the first user 506 and the second user 507. The first user 506 and second user 507 carry pocket-sized, wireless, account-based-wagering controllers, such as fobs. The fobs receive the wireless signals 504 and 505, and generate responses of additional wireless signals, that include unique identifiers that identify the fobs. The gaming device 501 recognizes, via the response of the additional wireless signals, an identity of the first user 506 and the second user 507 based on the unique identifiers read from the fobs. The fobs receive the wireless signals 504 and/or 505, and make sounds or vibrations to get the attention of the first user 506 and the second user 507. For example, a first fob, for the first user 506, generates a notification 508 of sounds based on characteristics of a first message 516 presented on the display 503, as shown in FIG. 5B. The first message 516 is a first type of message related to rules of a long-running wagering game where a player's game representative object (e.g., a fish 514 that represents the first user 506), requires periodic wagers, game achievements, etc. to maintain a level of health. The first message 516, for instance, identifies the first user 506 by name, based on information obtained from the player's account in response to detecting the unique identifier for the first fob associated with the first user 506. The first message 516 also requests the first user 506 to make a wager that will feed the fish 514. The notification 508 includes a pattern of beeping that is specific to the first type associated with the first message 516. Thus, the first user 506 can hear that the first message 516 is of the first type based on the specific pattern of beeping. A second fob, for the second user 507, generates a notification 509 of sounds and vibrations based on characteristics of a second message 515 presented on the display 503, as shown in FIG. 5B. The second message 515 is a second type of message related to the rules of the long-running wagering game. The second message 515 identifies the user 507, by name, based on information obtained from the player's account in response to detecting an identifier for the second fob associated with the second user 507. The second message 515 further indicates that the second user 507 has been selected to perform a game related activity, such as casting a line from a fishing rod 517. The notification 508 includes a pattern of sounds and vibrations (i.e., "beeping" and "buzzing") that is specific to the second type associated with the second message 515. Thus, the second user 506 can see and feel that the second message 515 is of the second type based on the specific pattern of beeping and buzzing.

Figure 6A:
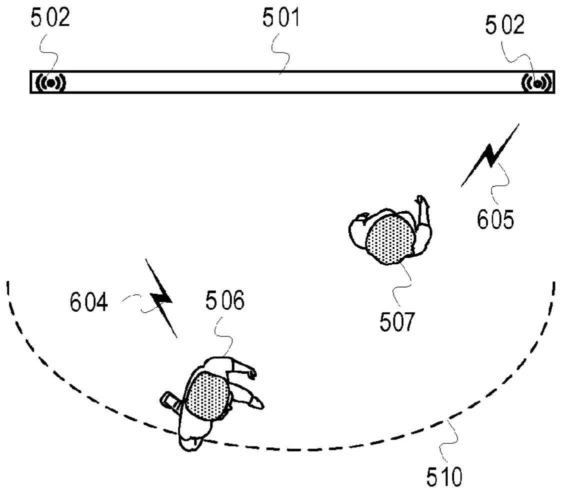
Figure 6B:
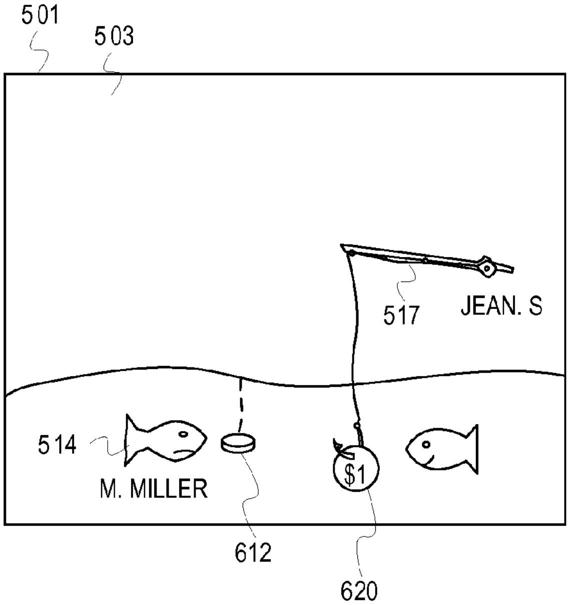

In FIG. 6A, the first user 506 responds to the first message 516 by reaching into his pocket and manipulating the first fob (e.g., pressing and holding a button on the first fob). The first fob for the first user 506 sends a wireless signal 604 in response to the user input from the first user 506. The wireless signal 604 indicates an intention by the first user 506 to make a wager. In response, the gaming device 501, logs in the first user 506 to the gaming device 501, initiates a wagering game session, and causes a coin 612 to fall toward the fish 514, as illustrated in FIG. 6B. Likewise, the second user 507 responds to the second message 515 by pointing the second fob at the gaming device 501 and performing a casting motion while holding the second fob in her hand and/or while activating one or more buttons on the second fob. The second fob sends a wireless signal 605 in response to the user input from the second user 507. The wireless signal 605 indicates an intention by the second user 507 to play. In response, the gaming device 501 logs in the second user 507 to the gaming device 501, initiates a wagering game session, and causes the fishing rod 517 to cast a coin 620.

Figure 7A:
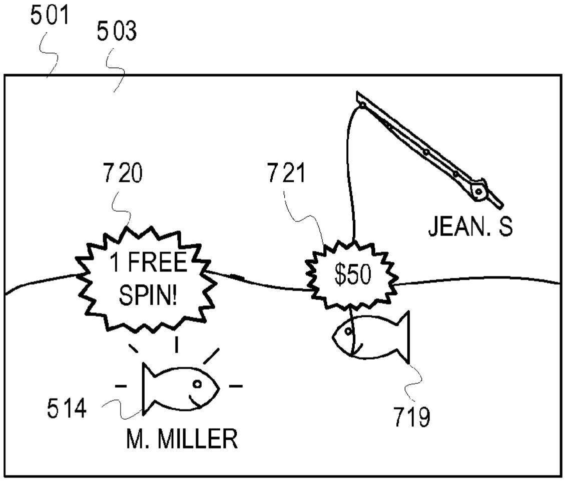
Figure 7B:
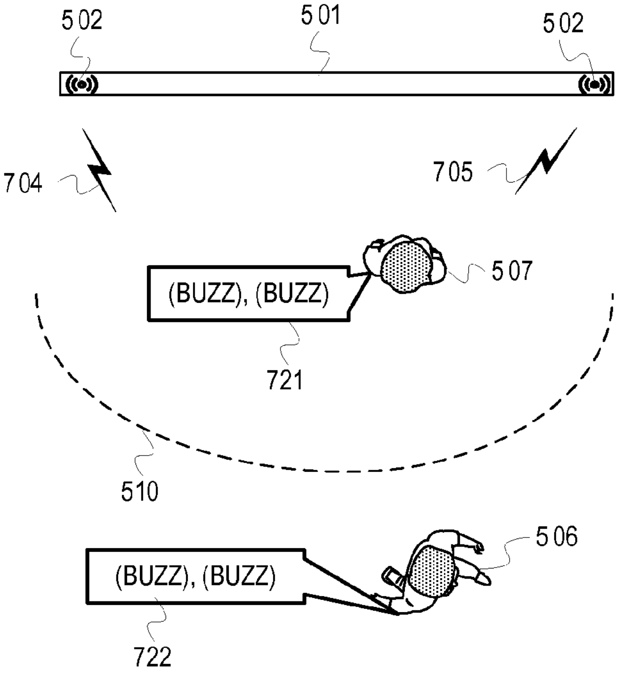

In FIG. 7A, the fish 514 (after eating the coin 612 from FIG. 6B) increases in health according to game rules. Further, the gaming device 501 presents a first gaming reward 720 of a free spin in a slot game. The gaming device 501 stores the first gaming reward 720 in the player account for the first user 506, which the first user 506 can access during any subsequent wagering game session. Further, after a fish 719 eats the coin 620 (from FIG. 6B), the gaming device presents a second gaming reward 721, and stores the second gaming reward 721 in a player account for the second user 507, which the second user 507 can subsequently access. In FIG. 7B, the gaming device 501 sends wireless signals 704 and 705 to the first fob and second fob, which then produce notifications 721 and 722 that indicate a specific pattern of vibrations that indicate a type of outcome (i.e., a pattern of buzzing that indicates a winning outcome, or reward, generated during the wagering game session). Further, when the first user 506 walks beyond the proximity range 510, the gaming device 501 automatically terminates the wagering game session for the first user 506.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 8:
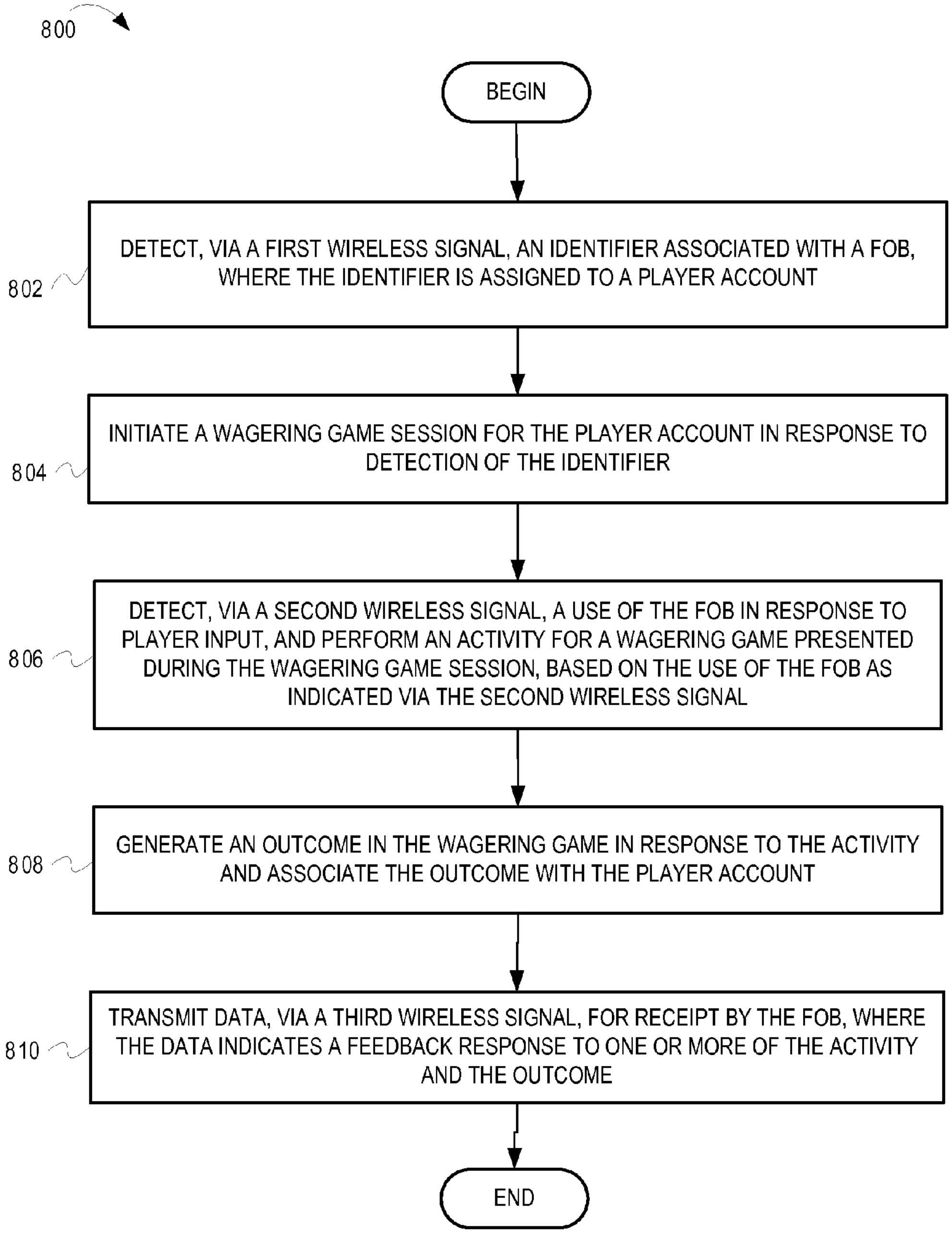
FIG. 8 is a flow diagram 800 illustrating controlling and conducting wagering activities via use of a mobile controller, according to some embodiments.

FIG. 8 is a flow diagram ("flow") 800 illustrating controlling and conducting wagering activities via use of a mobile controller, according to some embodiments. In FIG. 8, the flow 800 begins at processing block 802, where a wagering game system ("system") detects, via a first wireless signal, an identifier associated with a fob, where the identifier is assigned to a player account. The first wireless signal can be initiated via first player input via the fob. The fob is a type of pocket-sized, wireless, device, or mobile controller. The first wireless signal can include data such as the identifier. The data can describe motions, movements, actions, forces, orientations, acceleration, location, and other physical characteristics associated with the fob. The data can also describe specific player inputs via the fob, such as button pressing, roller-ball or mouse movements, laser pointing, etc. The fob can be used to point at, or select, a device such as via a laser pointer incorporated into the fob. The system can initiate a wireless connection between the fob and a device in a casino ("casino device"), such as a wagering game machine, a kiosk, a flat-screen panel, etc. The system can interface with the fob via RFID combined with blue-tooth, near-field communication technologies, etc. The identifier is a unique ID associated with the fob. The unique ID can be associated with a player, a player account, a group of players, or a wagering game session. For example, the system can use the identifier to identify, and connect to, a player account for a duration of a gaming session.

In some embodiments, the system detects the first wireless signal when the fob is within a specific distance range, or proximity, to a casino device. The system can activate use of the fob for a wagering game session simply by being within proximity to the casino device. In other example, however, the system can require security measures that verify the authenticity of the user to whom the fob has been assigned. For example, the system can require that the first wireless signal include an indication of a unique movement of the fob in relation to the casino device (e.g., the "Z" movement described in FIG. 1). In some embodiments, the unique motion can be player specified, as described in FIG. 3.

In some embodiments, the system can also require a biometric identification of the player via the fob before initiating a wagering game session (e.g., scan the player's fingerprint, detect a scent signature of the player, scan the player's retina, scan a player's facial map, etc.).

In some embodiments, the system detects, from the first wireless signal, information that identifies a specific casino device. For example, if a player is near multiple wagering game machines, and the player wants to use a specific wagering game machine for a wagering game session, the player can point the fob at the specific wagering game machine. The fob detects an orientation of the front of the fob and its directionality in relation to the specific wagering game machine. The fob can include the orientation data in the first wireless signal. The system, using the orientation data, can select the specific wagering game machine and establish the communication interface between the specific wagering game machine and the fob. In some embodiments, the system can require the fob to touch the casino device to select the wagering game session.

In some embodiments, the system tracks a location of the fob and presents a message (e.g., via a display, via speakers, etc.) along with an invitation to perform an activity in a wagering game or other wagering-game related application of the casino device (as similarly described in FIG. 5B).

The flow 800 continues at processing block 804, where the system initiates a wagering game session for the player account in response to detecting the identifier. For instance, when the fob interfaces with the casino device, the system initiates a wagering game session on the casino device for the player account using account login information. For example, the fob can transfer encrypted data, such as the identifier. The casino device, such as a wagering game machine, can decrypt and use the encrypted data to initiate a login process for a player account, for instance, as described in FIG. 1. In some embodiments, the system can require the fob to maintain a specific proximity to the casino device to maintain the wagering game session active. In some embodiments, the proximity can be within a few inches to several feet.

The flow 800 continues at processing block 806, where the system detects, via a second wireless signal, a use of the fob in response to player input, and performs an activity for a wagering game, presented during the wagering game session, based on the use of the fob as indicated via the second wireless signal. For instance, the use can be a specific type of movement or motion (e.g., a tossing motion, a shaking motion, etc.) of the fob in relation to the casino device. The use can also be a specific action associated with a button, a mouse, a pointer, or other user-input mechanism on the fob. In some embodiments, the activity indicates a placement of a wager amount for a wagering game. The system transacts the wager using funds from the player account. In some embodiments, the fob movement indicates a wager based on a type of movement (e.g., a throwing motion made while holding the fob indicates a tossing of a coin). In some embodiments, the activity performed in the wagering game involves movement of a game object, such as movement of reels, game elements, game characters, game icons, avatars, initials, etc. The activity can include interacting with groups of players (e.g., performing group tasks, competing at group games, etc.). In some embodiments, the system further generates an outcome in response to the use of the fob, such as generating a random number and using the random number to create a wagering game outcome (e.g., to create a reel-stop position). The system can further incorporate uses of the fob for games of skill.

In some embodiments, the system initiates a selection of a type of game that utilizes a type of the motion performed using the fob. For instance, the system can detect input via the fob for selecting a game title, type, or theme based on specific motions made with the fob that emulate a primary activity of the title, type or theme. For example if the system detects an overhead, tossing motion made using the fob, the system could evaluate and determine that the overhead, tossing motion is related to fishing games (i.e., the overhead tossing motion emulates a casting of a fishing line). The system could also evaluate and determine that the overhead, tossing motion is related to coin toss games (i.e., the overhead, tossing motion emulates a throwing motion of a coin). The system could also evaluate and determine that the overhead, tossing motion is related to specific sports games, such as football or baseball (i.e., the overhead, tossing motion emulates a type of throw typically performed in football or baseball). In another example, types or amounts, of motion of the fob can indicate different types or themes, such as movie themes, episodic game types, etc.

In some embodiments, the system initiates a transfer of funds from the player account to a wagering game session based on use of the fob, such as via specific motions, button presses, etc. For instance, the system can deposit and/or withdraw funds from a player account. In other embodiments, the system can access account settings or other account data, such as accessing player preferences, contact information, etc. in response to use of the fob.

The system can further generate and transmit a third wireless signal, addressed to, and receivable exclusively by, the fob. The third wireless signal, for example, can instruct the fob to request a verification from the user before performing an activity during the wagering game session (e.g., the system sends a signal to the fob to generate a light, sound, or vibration when a bet is made and request that a user press an additional button before the system transacts the bet). The system then, in response, receives a fourth wireless signal, from the fob, which authorizes the system to perform the activity.

Further, as mentioned previously, the system can provide controls via a user interface for a user to configure player preference associated with the fob prior to using the fob (e.g., preferences to indicate specific motions that indicate bet amounts, preferences to indicate a button usage rate, etc.).

The flow 800 continues at processing block 808, where the system generates an outcome in the wagering game in response to the activity and associates the outcome with the player account. For instance, in response to the activity (e.g., in response to a wager), the system can generate an outcome for a wagering game (e.g., a win or a loss). If the system generates a winning outcome, the system can store a reward for the win directly in the player account, such as by transferring funds to the player account, storing in the player account a persistent object that represents a game achievement, adding loyalty points to the player account, increasing social status points for the player account, storing a virtual asset in the player account, adding free spins to the player account, storing discounts for products or services available in a casino to the player account, and so forth.

The flow 800 continues at processing block 810, where the system transmits data, via a third wireless signal, for receipt by the fob, where the data indicates a feedback response to one or more of the activity and the outcome. For example, the system generates data that instructs the fob to generate one or more of lights, sounds and vibrations. The lights can be LEDs, for example, and a color of the LEDs can specify an activated or deactivated state of the fob. The LEDs can further indicate performance of the activity. The data can further instruct one or more speakers on the fob to generate sounds or instruct vibration devices to become active.

In some embodiments, the system can further transmit data for storage on the fob. For example, the system can store game activity, game history, etc. The fob stores the data, in some instances, for access after the wagering game session. For example, the system can store information about the game, such as a recording of an exciting game activity or outcome that was performed in the wagering game. The user can then carry the fob out of the casino, and connect the fob to a personal computer at home to replay the recording.

Further, in some embodiments, the system can terminate a wagering game session in response to use of the fob. For example, the system can terminate a wagering game session automatically in response to when a fob leaves a proximity range or in response to a specific combination of movement and button actions (e.g., a reverse "Z" motion combined with hold of a left button).

Additional Example Embodiments

According to some embodiments, a wagering game system ("system") can provide various example devices, operations, etc., to controlling wagering games via a mobile controller. The following non-exhaustive list enumerates some possible embodiments.

Use of a Mobile Controller without a Player Account.

In some embodiments, the system can utilize a fob, or similar type of mobile controller, during a wagering game session without connecting to a player account. For example, a player can insert a ticket or card that includes an identifier that represents the player temporarily during a wagering game session. The fob can provide the identifier, but does not necessarily have to be assigned to a player account. Instead, the identifier can be used to track game activity, wagers, and rewards, during the wagering game session. The ticket, card, or fob can transmit the identifier to the wagering game machine, and the wagering game machine can store information about the wagering game session, such as money transactions, until the session ends, and then write data to the ticket, card, fob, etc. The fob can be used wirelessly during the wagering game session to control actions for wagering games. Afterwards, a player can take the ticket, card, fob, etc., to a casino bank, or kiosk, and cash out, or attain other rewards.

Example Operating Environments

This section describes example operating environments, systems, networks, etc. and presents structural aspects of some embodiments.

Wagering Game System Architecture

Figure 9:
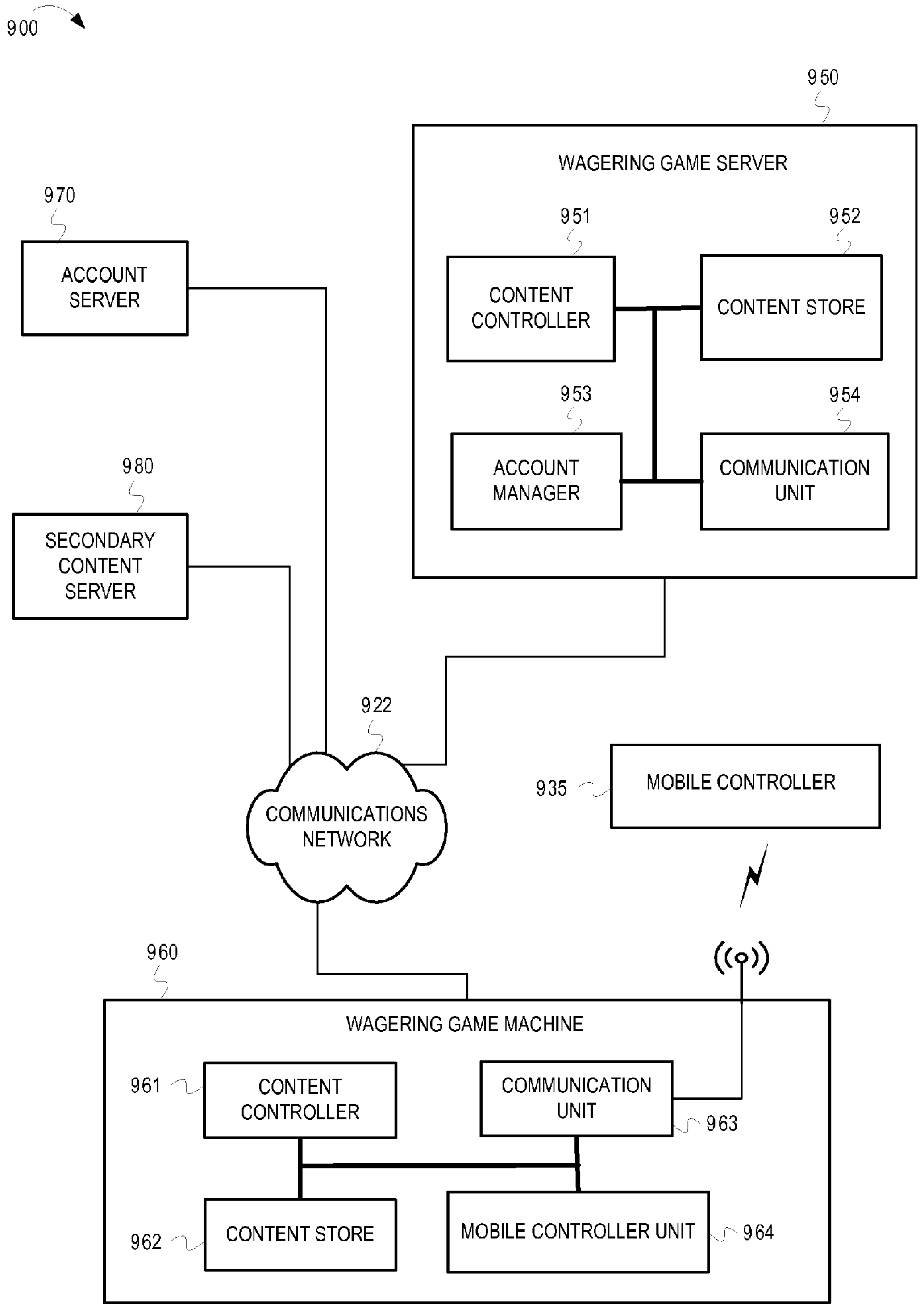
FIG. 9 is an illustration of a wagering game system architecture 900, according to some embodiments.

FIG. 9 is a conceptual diagram that illustrates an example of a wagering game system architecture 900, according to some embodiments. The wagering game system architecture 900 can include an account server 970 configured to control user related accounts accessible via wagering game networks. The account server 970 can store wagering game player account information, such as account settings (e.g., settings related to wagering games, settings related to social contacts, etc.), preferences (e.g., player preferences regarding gaming controls, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 970 can contain lists of social contacts referenced by a player account. The account server 970 can also provide auditing capabilities, according to regulatory rules. The account server 970 can also track performance of players, machines, and servers. The account server 970 can include an account controller 971 configured to control information for a player's account. The account server 970 can also include an account store 972 configured to store information for a player's account.

The wagering game system architecture 900 can also include a wagering game server 950 configured to control wagering game content, provide random numbers, and communicate wagering game information, account information, and other information to and from a wagering game machine 960. The wagering game server 950 can include a content controller 951 configured to manage and control content for presentation on the wagering game machine 960. For example, the content controller 951 can generate game results (e.g., win/loss values), including win amounts, for games played on the wagering game machine 960. The content controller 951 can communicate the game results to the wagering game machine 960. The content controller 951 can also generate random numbers and provide them to the wagering game machine 960 so that the wagering game machine 960 can generate game results. The wagering game server 950 can also include a content store 952 configured to contain content to present on the wagering game machine 960. The wagering game server 950 can also include an account manager 953 configured to control information related to player accounts. For example, the account manager 953 can communicate wager amounts, game results amounts (e.g., win amounts), bonus game amounts, etc., to the account server 970. The wagering game server 950 can also include a communication unit 954 configured to communicate information to the wagering game machine 960 and to communicate with other systems, devices and networks.

The wagering game system architecture 900 can also include a mobile controller 935 configured to control mobile communications, transmit and receive wireless signals associated with a wagering game player account and that describe player input. In some embodiments, the mobile controller 935 is a pocket-sized computing device. In some examples, the mobile controller 935 is a fob. In other examples the mobile controller 935 may be incorporated into, or be, a smartphone, a personal digital assistant, a mobile computer, a mobile internet device, a portable media player, a mobile phone, a pager, a personal navigation device, etc. In some embodiments, the mobile controller 935 may include radio frequency identification (RFID) components, near-field communication mechanisms, and other wireless communication elements.

The wagering game system architecture 900 can also include the wagering game machine 960 configured to present wagering games and receive and transmit information to controlling wagering games via the mobile controller 935. The wagering game machine 960 can include a content controller 961 configured to manage and control content and presentation of content on the wagering game machine 960. The wagering game machine 960 can also include a content store 962 configured to contain content to present on the wagering game machine 960. The wagering game machine 960 can also include a communication unit 963 configured to communicate with the mobile controller 935. The wagering game machine 960 can also include a mobile controller unit 964 configured to interpret data received from the mobile controller 935 to login users, control wagering game sessions, control wagering game activity, and so forth. The mobile controller unit 964 is further configured to generate instructions, notifications, and other information to transmit to via wireless signals to the mobile controller 935.

The wagering game system architecture 900 can also include a secondary content server 980 configured to provide content and control information for secondary games and other secondary content available on a wagering game network (e.g., secondary wagering game content, promotions content, advertising content, player tracking content, web content, etc.). The secondary content server 980 can provide "secondary" content, or content for "secondary" games presented on the wagering game machine 960. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 980 can provide and control content for community games, including networked games, social games, competitive games, or any other game that multiple players can participate in at the same time. In some embodiments, the secondary content server 980 can control and present an online website that hosts wagering games. The secondary content server 980 can also be configured to present multiple wagering game applications on the wagering game machine 960 via a wagering game website, or other gaming-type venue accessible via the Internet. The secondary content server 980 can host an online wagering website and/or a social networking website. The secondary content server 980 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). In some embodiments, the secondary content server 980 can also host social networking accounts, provide social networking content, control social networking communications, store associated social contacts, etc. The secondary content server 980 can also provide chat functionality for a social networking website, a chat application, or any other social networking communications mechanism. In some embodiments, the secondary content server 980 can utilize player data to determine marketing promotions that may be of interest to a player account. The secondary content server 980 can also analyze player data and generate analytics for players, group players into demographics, integrate with third party marketing services and devices, etc. The secondary content server 980 can also provide player data to third parties that can use the player data for marketing. In some embodiments, the secondary content server 980 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

Each component shown in the wagering game system architecture 900 is shown as a separate and distinct element connected via a communications network 922. However, some functions performed by one component could be performed by other components. For example, the wagering game server 950 can also be configured to perform functions of the communication unit 963, the mobile controller unit 964, and other network elements and/or system devices. Furthermore, the components shown may all be contained in one device, but some, or all, may be included in, or performed by, multiple devices, as in the configurations shown in FIG. 9 or other configurations not shown. For example, the account manager 953 and the communication unit 954 can be included in the wagering game machine 960 instead of, or in addition to, being a part of the wagering game server 950. Further, in some embodiments, the wagering game machine 960 can determine wagering game outcomes, generate random numbers, etc. instead of, or in addition to, the wagering game server 950.

The wagering game machines described herein (e.g., wagering game machine 960) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 900 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Computer System

Figure 10:
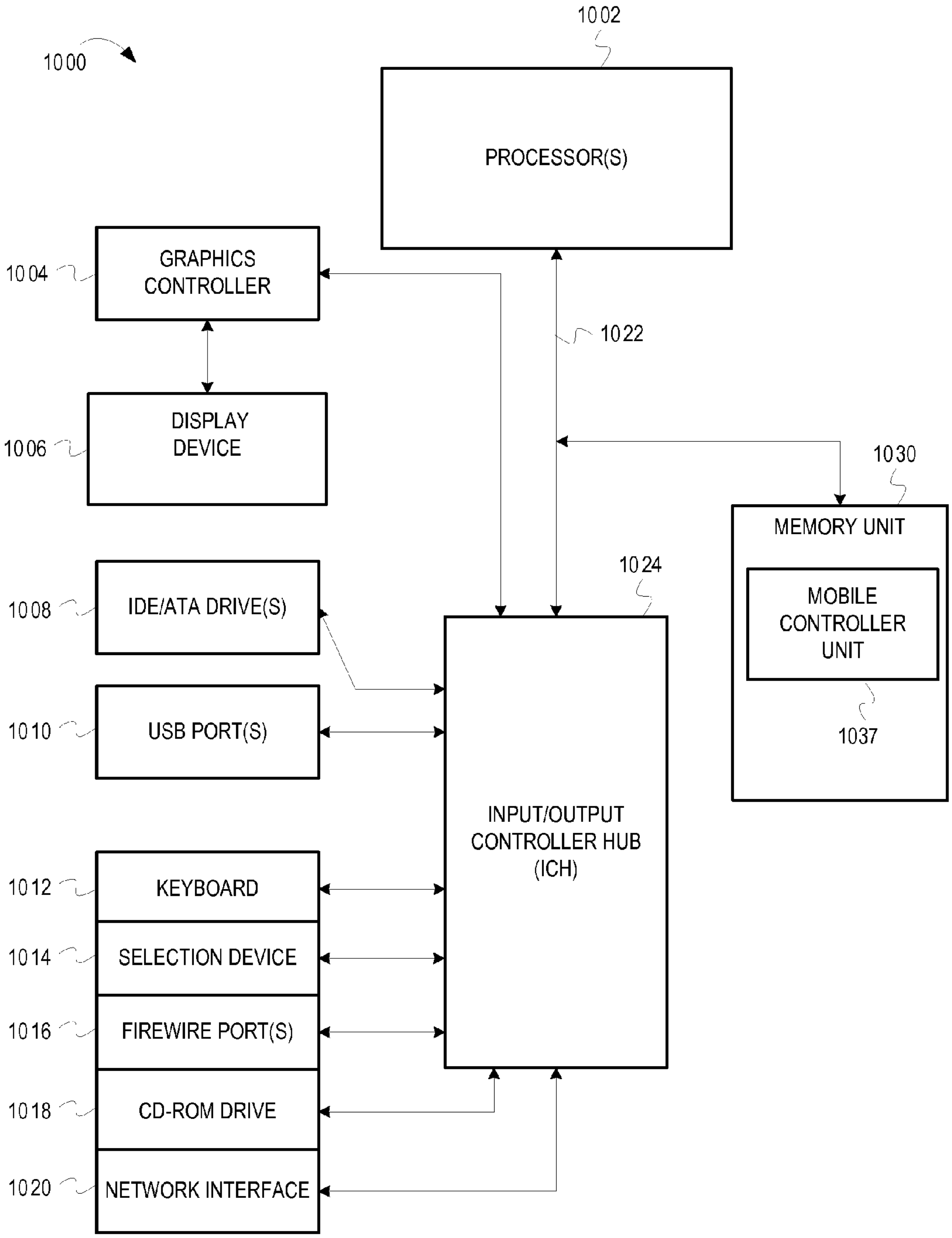
FIG. 10 is an illustration of a wagering game computer system 1000, according to some embodiments.

FIG. 10 is a conceptual diagram that illustrates an example of a wagering game computer system 1000, according to some embodiments. In FIG. 10, the wagering game computer system ("computer system") 1000 may include a processor unit 1002, a memory unit 1030, a processor bus 1022, and an Input/Output controller hub (ICH) 1024. The processor unit 1002, memory unit 1030, and ICH 1024 may be coupled to the processor bus 1022. The processor unit 1002 may comprise any suitable processor architecture. The computer system 1000 may comprise one, two, three, or more processors, any of which may execute a set of instructions in accordance with some embodiments.

The memory unit 1030 may also include an I/O scheduling policy unit and I/O schedulers. The memory unit 1030 can store data and/or instructions, and may comprise any suitable memory, such as a dynamic random access memory (DRAM), for example. The computer system 1000 may also include one or more suitable integrated drive electronics (IDE) drive(s) 1008 and/or other suitable storage devices. A graphics controller 1004 controls the display of information on a display device 1006, according to some embodiments.

The ICH 1024 provides an interface to I/O devices or peripheral components for the computer system 1000. The ICH 1024 may comprise any suitable interface controller to provide for any suitable communication link to the processor unit 1002, memory unit 1030 and/or to any suitable device or component in communication with the ICH 1024. The ICH 1024 can provide suitable arbitration and buffering for each interface.

For one embodiment, the ICH 1024 provides an interface to the one or more IDE drives 1008, such as a hard disk drive (HDD) or compact disc read only memory (CD ROM) drive, or to suitable universal serial bus (USB) devices through one or more USB ports 1010. For one embodiment, the ICH 1024 also provides an interface to a keyboard 1012, selection device 1014 (e.g., a mouse, trackball, touchpad, etc.), CD-ROM drive 1018, and one or more suitable devices through one or more firewire ports 1016. For one embodiment, the ICH 1024 also provides a network interface 1020 through which the computer system 1000 can communicate with other computers and/or devices.

The computer system 1000 may also include a machine-readable storage medium that stores a set of instructions (e.g., software) embodying any one, or all, of the methodologies to control wagering games via a mobile controller. Furthermore, software can reside, completely or at least partially, within the memory unit 1030 and/or within the processor unit 1002. The computer system 1000 can also include a mobile controller unit 1037. The mobile controller unit 1037 can process communications, commands, or other information, to control wagering games via a mobile controller. Any component of the computer system 1000 can be implemented as hardware, firmware, and/or machine-readable storage media including instructions for performing the operations described herein.

Wagering Game Machine Architecture

Figure 11:
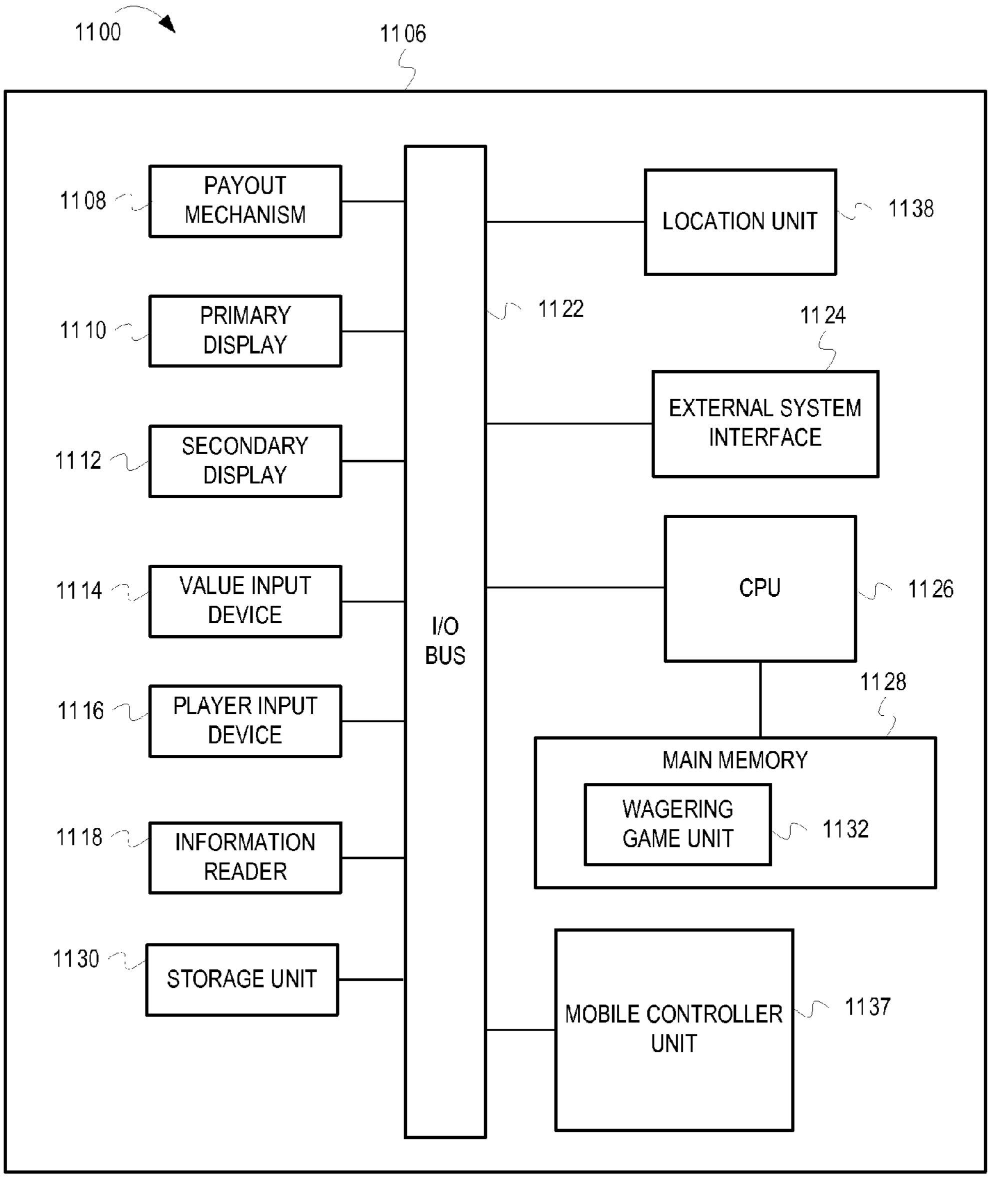
FIG. 11 is an illustration of a wagering game machine architecture 1100, according to some embodiments.

FIG. 11 is a conceptual diagram that illustrates an example of a wagering game machine architecture 1100, according to some embodiments. In FIG. 11, the wagering game machine architecture 1100 includes a wagering game machine 1106, which includes a central processing unit (CPU) 1126 connected to main memory 1128. The CPU 1126 can include any suitable processor, such as an Intel® Pentium processor, Intel® Core 2 Duo processor, AMD Opteron™ processor, or UltraSPARC processor. The main memory 1128 includes a wagering game unit 1132. In some embodiments, the wagering game unit 1132 can present wagering games, such as video poker, video black jack, video slots, video lottery, reel slots, etc., in whole or part.

The CPU 1126 is also connected to an input/output ("I/O") bus 1122, which can include any suitable bus technologies, such as an AGTL+frontside bus and a PCI backside bus. The I/O bus 1122 is connected to a payout mechanism 1108, primary display 1110, secondary display 1112, value input device 1114, player input device 1116, information reader 1118, and storage unit 1130. The player input device 1116 can include the value input device 1114 to the extent the player input device 1116 is used to place wagers. The I/O bus 1122 is also connected to an external system interface 1124, which is connected to external systems (e.g., wagering game networks). The external system interface 1124 can include logic for exchanging information over wired and wireless networks (e.g., 802.11g transceiver, Bluetooth transceiver, Ethernet transceiver, etc.)

The I/O bus 1122 is also connected to a location unit 1138. The location unit 1138 can create player information that indicates the wagering game machine's location/movements in a casino. In some embodiments, the location unit 1138 includes a global positioning system (GPS) receiver that can determine the wagering game machine's location using GPS satellites. In other embodiments, the location unit 1138 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 11, in some embodiments, the location unit 1138 is not connected to the I/O bus 1122.

In some embodiments, the wagering game machine 1106 can include additional peripheral devices and/or more than one of each component shown in FIG. 11. For example, in some embodiments, the wagering game machine 1106 can include multiple external system interfaces 1124 and/or multiple CPUs 1126. In some embodiments, any of the components can be integrated or subdivided.

In some embodiments, the wagering game machine 1106 includes a mobile controller unit 1137. The mobile controller unit 1137 can process communications, commands, or other information, where the processing can control wagering games via a mobile controller.

Furthermore, any component of the wagering game machine 1106 can include hardware, firmware, and/or machine-readable storage media including instructions for performing the operations described herein.

Wagering Game Machine

Figure 12:
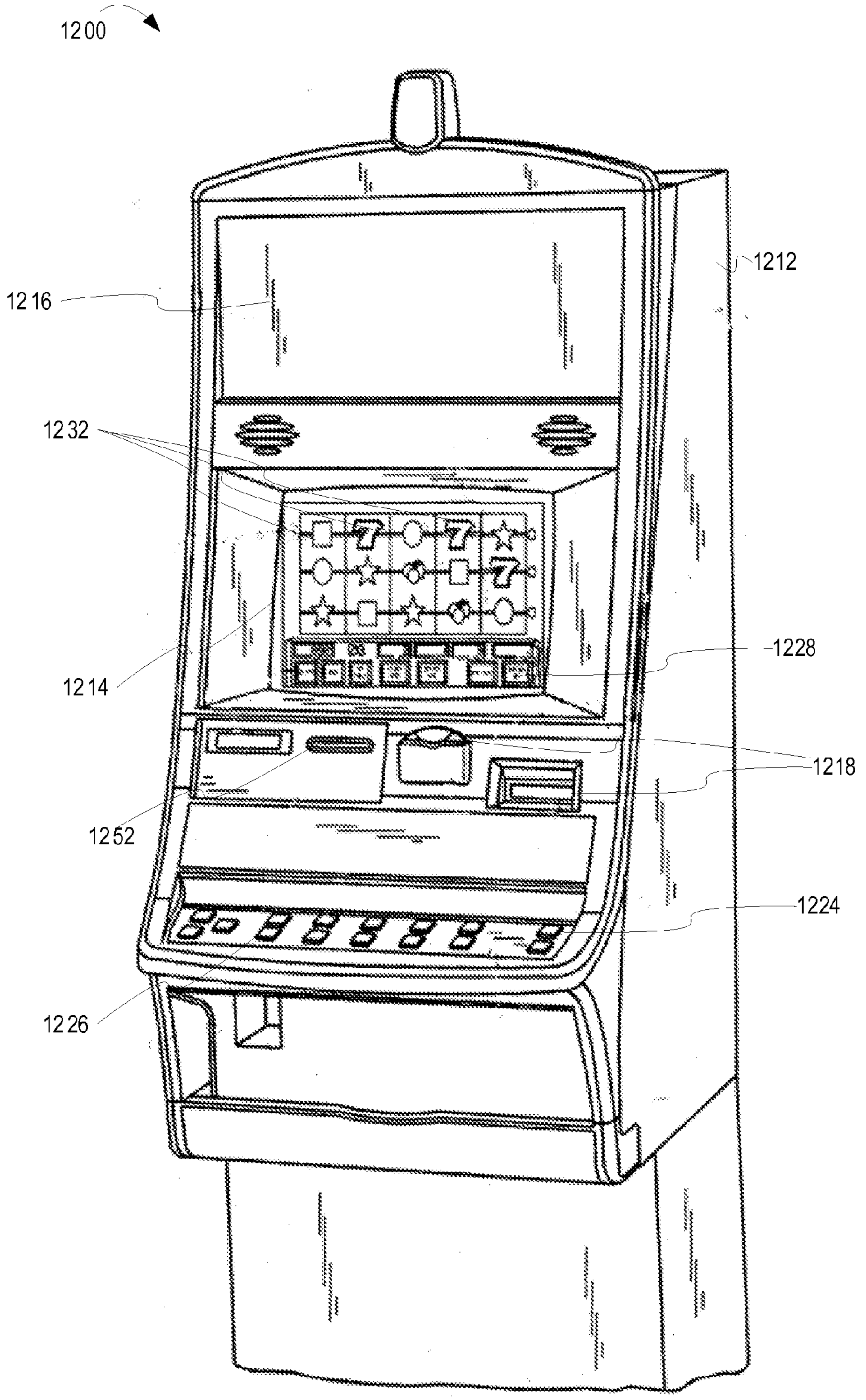
FIG. 12 is an illustration of a wagering game machine 1200, according to some embodiments.

FIG. 12 is a conceptual diagram that illustrates an example of a wagering game machine 1200, according to some embodiments. Referring to FIG. 12, the wagering game machine 1200 can be used in gaming establishments, such as casinos. According to some embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1228 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), a three-dimensional (3D) display, or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bar top model, mobile handheld model, or workstation console model.

A player begins playing a basic wagering game by making a wager via the value input device 1218. The player can initiate play by using the player input device's buttons or touch screen 1228. The basic game can include arranging a plurality of symbols 1232 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface. In some embodiments, the information reader 1252 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

detecting that a key fob enters a wireless proximity range to a wagering game machine;

requesting a first unique identifier wirelessly from the key fob in response to the key fob entering the wireless proximity range;

detecting the first unique identifier transmitted wirelessly from the key fob;

in response to detecting the first unique identifier, detecting, via one or more processors, that the first unique identifier of the key fob is associated with a second unique identifier of a wagering game player account;

in response to detecting that the first unique identifier is associated with the second unique identifier, initiating, via at least one of the one or more processors, a wagering game session for the wagering game player account via the wagering game machine;

detecting that the key fob leaves the wireless proximity range; and terminating the wagering game session in response to the detecting that the key fob leaves the wireless proximity range.

2. The computer-implemented method of claim 1, further comprising:

detecting a motion pattern of the key fob;

verifying that the motion pattern of the key fob matches a setting, associated with the wagering game player account, which setting describes the motion pattern; and authorizing initiation of the wagering game session in response to the verifying that the motion pattern of the key fob matches the setting.

3. The computer-implemented method of claim 1 further comprising:

performing an activity for a wagering game presented during the wagering game session in response to use of the key fob.

4. The computer-implemented method of claim 3, wherein the activity for the wagering game comprises one or more of modifying a wager amount for the wagering game, transacting a wager via the wagering game player account, controlling an object presented via a user interface of the wagering game machine, selecting a type of the wagering game based on a type of motion of the key fob, and transferring funds between the wagering game machine and a memory store associated with the wagering game player account.

5. The computer-implemented method of claim 3 further comprising:

generating an outcome in the wagering game in response to the activity; and associating the outcome with the wagering game player account.

6. The computer-implemented method of claim 5 further comprising:

transmitting data, for receipt by the key fob, wherein the data indicates one or more instructions for the key fob to generate a feedback response, via an output mechanism of the key fob, to one or more of the activity and the outcome.

7. One or more non-transitory, machine-readable storage media having instructions stored thereon, which when executed by a set of one or more processors causes the set of one or more processors to perform operations comprising:

detecting, via a first wireless signal, an identifier associated with a key fob, wherein the identifier is assigned to a wagering game player account;

initiating a wagering game session for the wagering game player account, via a wagering game machine, in response to detecting the identifier;

detecting, via a second wireless signal, a use of the key fob in response to player input; and performing an activity for a wagering game presented during the wagering game session based on the use of the key fob indicated via the second wireless signal, wherein the operation for performing the activity for the wagering game includes operations comprising one or more of modifying a wager amount for the wagering game, transacting a wager using the wagering game player account, controlling an object presented via a user interface of the wagering game machine, selecting a type of the wagering game based on a type of motion of the key fob, and transferring funds between the wagering game machine and a memory store associated with the wagering game player account.

8. The one or more machine-readable storage media of claim 7, wherein the operation for detecting the use of the key fob includes operations further comprising:

detecting a motion pattern of the key fob;

verifying that the motion pattern of the key fob matches a setting, associated with the wagering game player account, which setting describes the motion pattern; and authorizing initiation of the wagering game session in response to the verifying that the motion pattern of the key fob matches the setting.

9. The one or more machine-readable storage media of claim 7, said operations further comprising:

requesting the identifier wirelessly from the key fob in response to the key fob entering a proximity range to the wagering game machine.

10. The one or more machine-readable storage media of claim 9, said operations further comprising:

detecting that the key fob leaves the proximity range to the wagering game machine; and terminating the wagering game session in response to the detecting that the key fob leaves the proximity range to the wagering game machine.

11. The one or more machine-readable storage media of claim 7, said operations further comprising:

transmitting data, via a third wireless signal, for receipt by the key fob, wherein the data indicates an instruction for the key fob to generate one or more of a light, a sound, and a vibration via an output mechanism of the fob in response to an outcome of the wagering game.

12. A system comprising:

one or more processors; and a controller unit configured to, via the one or more processors, detect an identifier associated with a wireless security token device via a first wireless signal generated by the wireless security token device, determine that the identifier is assigned to a wagering game player account, initiate a wagering game session for the wagering game player account in response to detection of the identifier, detect a description of a use of one or more input controls of the wireless security token device via a second wireless signal generated by the wireless security token device, perform an activity for a wagering game presented during the wagering game session based on the description of the use of the wireless security token device, detect a movement of the wireless security token device, modify the description of the use of the wireless security token device to indicate the movement of the wireless security token device, and modify movement of a wagering game element based on the movement of the wireless security token device.

13. The system of claim 12, wherein the wireless security token device is configured to generate the first wireless signal automatically when the wireless security token device enters a proximity range to a wagering game machine.

14. The system of claim 12, wherein the controller unit is further configured to transmit a third wireless signal, addressed to the wireless security token device, wherein the third wireless signal includes a request to authorize initiation of performance of the activity, and receive a fourth wireless signal, from the wireless security token device, wherein the fourth wireless single authorizes initiation of the performance of the activity.

15. The system of claim 12, wherein the wireless security token device is configured to authenticate a fingerprint of a user prior to transmission of one or more of the first wireless signal and the second wireless signal.

16. An apparatus comprising:

one or more processors; and a controller unit configured to, via the one or more processors, receive a first wireless signal transmitted from a wireless security token device;

detect, from the first wireless signal, an identifier associated with a wireless security token device, wherein the identifier is assigned to a wagering game player account, initiate a wagering game session for the wagering game player account, via a wagering game machine, in response to detecting the identifier, receive a second wireless signal transmitted from the wireless security token device;

detect, from the second wireless signal, a use of the wireless security token device to indicate a request to make a wager, and transact a wager for a wagering game presented during the wagering game session in response to the detection of the use of the wireless security token device to indicate the request to make the wager.

17. The apparatus of claim 16, wherein the use of the wireless security token device comprises one or more of a unique movement associated with wireless security token device and an activation of one or more user-input mechanisms of the wireless security token device.

18. The apparatus of claim 16, wherein the controller unit is further configured to transmit data, via a third wireless signal, for receipt by the wireless security token device, where the data instructs the wireless security token device to perform a feedback response to one or more of transaction of the wager and an outcome of the wagering game.

19. The apparatus of claim 16, wherein the controller unit is further configured to read a user preference setting, from the wagering game player account, which user preference setting describes a specific action associated with the use of the wireless security token device, wherein the specific action signifies an intention to make a wager, determine that data from the second wireless signal indicates that the specific action was performed via the use of the wireless security token device, and transact the wager for the wagering game in response to determination that the data from the second wireless signal indicates that the specific action was performed via the use of the wireless security token device.

20. An apparatus comprising:

means for detecting, via a first wireless signal, an identifier associated with a wireless security token device, where the identifier is assigned to a wagering game session;

means for detecting, via a second wireless signal, a use of one or more input controls of the wireless security token device in response to player input, wherein the use of the one or more input controls indicates a request to perform a wagering activity for a wagering game;

means for initiating the wagering game session in response to detecting the use of the one or more input controls of the wireless security token device; and means for performing the wagering activity for the wagering game presented during the wagering game session in response to the use of the one or more input controls of the wireless security token device indicated via the second wireless signal.

21. The apparatus of claim 20 further comprising:

means for detecting an award provided in response to the performing of the activity; and means for associating the award with the identifier.

22. The apparatus of claim 21, wherein the means for associating the award with the identifier comprises:

means for generating data that identifies a value for the award; and means for storing the data on the wireless security token device.

23. The apparatus of claim 21, wherein the wagering activity for the wagering game comprises one or more of making a wager for the wagering game, modifying a wager amount for the wagering game, and transferring wagering funds between the wagering game machine and a memory store associated with the wagering game player account.

24. A computer-implemented method comprising:

detecting that a key fob, within a proximity range from a wagering game machine, is associated with a wagering game player account;

detecting a motion pattern of the key fob;

verifying, via one or more processors, that the motion pattern of the key fob matches a setting, associated with the wagering game player account, which setting describes the motion pattern; and performing an event for a wagering game session in response to the verifying that the motion pattern of the key fob matches the setting.

25. The computer-implemented method of claim 24, wherein the performing the event causes movement of a wagering game element for the wagering game based on the motion pattern of the key fob.

26. The computer-implemented method of claim 24, wherein the event comprises one or more of authorizing initiation of the wagering game session and performing a wagering game activity in the wagering game session.

27. A system comprising:

one or more processors; and one or more memory storage devices configured to store instructions, which when executed by at least one of the one or more processors, cause the system to perform operations to:

establish a wireless connection between a key fob and a wagering game machine, wherein the wagering game machine is configured to present a wagering game, determine that the key fob is associated with a wagering game player account associated with the wagering game, detect use of the key fob to perform a function of the wagering game, wherein a wagering game outcome for the wagering game occurs in response to performance of the function, and instruct the key fob, via the wireless connection, to generate a feedback response, via an output mechanism of the key fob, based on the wagering game outcome.

28. The system of claim 27, wherein the one or more memory storage devices are configured to store instructions, which when executed by at least one of the one or more processors, cause the system to perform operations to instruct the key fob to generate one or more of a light, a sound, and a vibration via the output mechanism of the fob.

29. The system of claim 27, wherein the one or more memory storage devices are configured to store instructions, which when executed by at least one of the one or more processors, cause the system to further perform operations to:

detect that the use of the key fob follows a customized pattern indicated in the wagering game player account; and perform the function of the wagering game according to the customized pattern indicated in the wagering game player account.

* * * * *